United States Patent Office 2,871,223
Patented Jan. 27, 1959

2,871,223

POLYMERS, COPOLYMERS, AND PROCESSES FOR PREPARING THEM

Elinor M. Hankins and Sidney Melamed, Philadelphia, Pa., assignors to Rohm & Haas Company, Philadelphia, Pa., a corporation of Delaware No Drawing. Application November 1, 1954
Serial No. 466,198

18 Claims. (Cl. 260—70)

This invention relates to novel polymeric aminomethyl-substituted ureido derivatives of vinyl ethers and of esters and amides of an acrylic acid and to processes for the preparation thereof.

It is an object of this invention to provide novel polymeric organic substances containing basic amino groups. A further object is to provide a specific group of substances of this type which are water-soluble or water-dispersible and are adapted to be converted to insoluble substances. Another object is to provide a specific group of substances of this type which are insoluble in water but soluble in organic solvents. Still another object is to provide a specific group of substances of this type which are insoluble in water and common organic substances. Other objects are to provide processes for producing the new polymeric substances. Other objects and advantages will appear hereinafter.

The polymeric substances of the present invention are obtained by the condensation of one or more primary or secondary amines mentioned hereinafter with a reaction product of formaldehyde and an addition polymer of a member of the group consisting of a ureido-vinyl ether, an ester of an acrylic acid, and an amide of an acrylic acid, the member having the structure of one of the Formulas I, II, and III,

I  YANRCONH$_2$

II YANRCONHR'

III 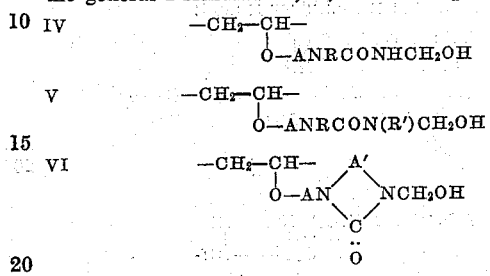

in which Y is selected from the group consisting of
CH$_2$:CHO—, CH$_2$:CR$^2$COO—,
and
CH$_2$:CR$^2$CON(R$^3$)—,
R$^2$ being hydrogen or methyl and R$^3$ being hydrogen or methyl, A is
—C$_2$H$_4$—, —CH(CH$_3$)CH$_2$—, —CH$_2$CH(CH$_3$)—, or —(CH$_2$)$_3$—, A' is —(CH$_2$)$_2$—, —CH$_2$CH(CH$_3$)—, —CH(CH$_3$)CH$_2$—, or (CH$_2$)$_3$—, R is H, methyl, or ethyl, and R' is methyl or ethyl.

The polymers of the present invention may also be obtained by reacting formaldehyde with an amine of the class above and then with an addition polymer of a member of one of Formulas I, II, and III above, or they may be made by mixing the amine with the addition polymer and then reacting the mixture with formaldehyde.

From 1 to 5 moles of formaldehyde per ureido group may be mixed with the polymer for reaction therewith, a ratio of about 2 moles of formaldehyde per ureido group in the polymer being preferred. Since this is an equilibrium reaction, only part of the formaldehyde is chemically combined with the polymer, the combined portion generally being from about 0.5 to 1.5 moles, and preferably about one mole, per ureido unit. Since a poly-ureido compound is involved, some of the ureido units may be combined with two or three equivalents of formaldehyde when as many reactive hydrogens are present on the nitrogen atoms, some of the units may be uncombined and others may be combined with a single equivalent of formaldehyde. The most commonly occurring units in polymers of the vinyl ether compounds of Formulas I, II, and III, are probably of the general Formulas IV, V, and VI respectively:

IV   —CH$_2$—CH—
           |
           O—ANRCONHCH$_2$OH

V    —CH$_2$—CH—
           |
           O—ANRCON(R')CH$_2$OH

VI 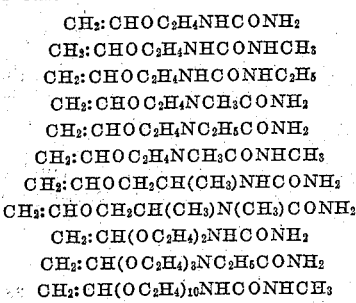

The structures of the methylolated esters and amides are analogous. Representative compounds of Formulas I, II, and III whose polymers including copolymers are reacted with formaldehyde are:

A. Vinyl ethers:

CH$_2$:CHOC$_2$H$_4$NHCONH$_2$
CH$_2$:CHOC$_2$H$_4$NHCONHCH$_3$
CH$_2$:CHOC$_2$H$_4$NHCONHC$_2$H$_5$
CH$_2$:CHOC$_2$H$_4$NCH$_3$CONH$_2$
CH$_2$:CHOC$_2$H$_4$NC$_2$H$_5$CONH$_2$
CH$_2$:CHOC$_2$H$_4$NCH$_3$CONHCH$_3$
CH$_2$:CHOCH$_2$CH(CH$_3$)NHCONH$_2$
CH$_2$:CHOCH$_2$CH(CH$_3$)N(CH$_3$)CONH$_2$
CH$_2$:CH(OC$_2$H$_4$)$_2$NHCONH$_2$
CH$_2$:CH(OC$_2$H$_4$)$_3$NC$_2$H$_5$CONH$_2$
CH$_2$:CH(OC$_2$H$_4$)$_{10}$NHCONHCH$_3$

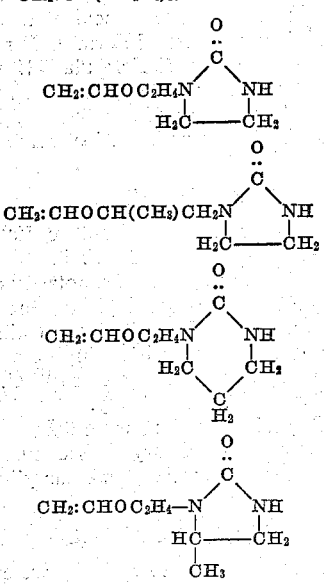

B. Esters of acrylic or methacrylic acid:

CH$_2$:CHCOOC$_2$H$_4$NHCONH$_2$
CH$_2$:C(CH$_3$)COOC$_2$H$_4$NHCONH$_2$
CH$_2$:CHCOOC$_2$H$_4$NHCONHCH$_3$
CH$_2$:CHCOOC$_2$H$_4$NHCONHC$_2$H$_5$
CH$_2$:CHCOOC$_2$H$_4$NCH$_3$CONH$_2$
CH$_2$:C(CH$_3$)COOC$_2$H$_4$N(CH$_3$)CONHCH$_3$
CH$_2$:CHCOOC$_3$H$_6$NHCONH$_2$
CH$_2$:CHCOOCH$_2$CH(CH$_3$)NHCONH$_2$

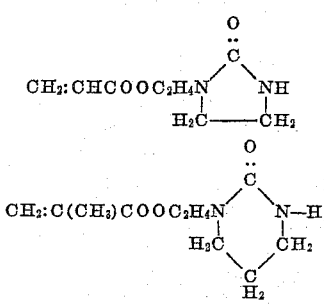

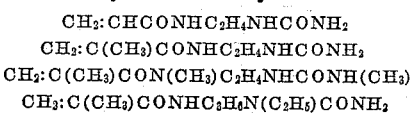

C. Amides of acrylic or methacrylic acid:

CH₂:CHCONHC₂H₄NHCONH₂
CH₃:C(CH₃)CONHC₂H₄NHCONH₂
CH₂:C(CH₃)CON(CH₃)C₂H₄NHCONH(CH₃)
CH₃:C(CH₃)CONHC₃H₆N(C₂H₅)CONH₂

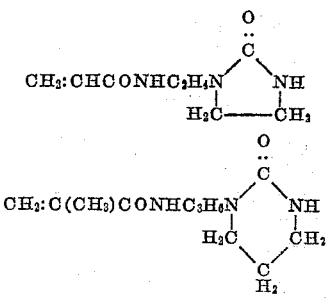

These compounds, their polymers including their copolymers, and their methylolated polymers may be made by the procedures described in one or more of U. S. Patents 2,689,844; 2,694,695; 2,727,016; 2,727,019; 2,734,890; and 2,734,891. Thus, the vinyl ether compounds of Formula I are made by reacting a vinyl ether of Formula VII

VII        CH₂:CHOANHR with a water-soluble inorganic cyanate, such as of sodium or potassium, in the presence of acid at temperatures of zero to 50° C. Vinyl ethers of Formula II may be made by reacting a vinyl ether of Formula VII with an isocyanate of the structure R'NCO at a temperature of —10° C. to 100° C. The vinyl ethers of Formula III may be made by the reaction of a compound of the Formula VIII

VIII        HOANHA'NH₂ with acetylene under pressure of 100 to 500 pounds per square inch at 120° C. to 180° C. in the presence of a strongly basic catalyst, such as potassium hydroxide or potassium metal to form a vinyl ether of the hydroxy amine which may then be purified by distillation or by crystalization and the resulting vinyl ether is heated with urea at temperatures of about 110° C. to 200° C. until ammonia is evolved completely.

Esters of Formulas I and II are obtained by the reaction of ammonia or a primary or secondary amine on an isocyanato ester of acrylic or methacrylic acid of the formula

CH₂:C(R²)COOANCO at a temperature of 0° C. to 50° C., preferably in the presence of an inert solvent, such as benzene, toluene, xylene, pentane and the like. The isocyanato esters may be made by the steps of (1) reacting ethyl chloroformate with an aminoalcohol of the formula

HOANH₂ in a solvent such as benzene, chloroform, or toluene in the presence of an HCl-acceptor, such as sodium hydroxide while keeping the temperature from rising higher than 80° C., and preferably from exceeding 60° C. during the addition of the chloroformate, and thereafter heating at reflux, and purifying by removing salt and solvent; (2) reacting the resulting product (HOANHCOOC₂H₅)

with an acid halide of acrylic or methacrylic acid in the presence of acrylonitrile as an acceptor for the HCl liberated by heating the mixture to about 80° C. for several hours, and purifying the resulting compound of the formula

CH₂:CR²COOANHCOOC₂H₅ such as by distillation, and (3) heating the last-mentioned compound in the presence of phosphorous pentachloride at a temperature of 170° C. to 300° C. to distill the isocyanato ester desired.

Esters of Formula III are prepared by the reaction of acrylyl chloride or of methacrylyl chloride and compounds of the formula

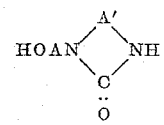

preferably in the presence of a tertiary amine, such as pyridine.

Amides of Formulas I and II are obtained by reacting acrylyl chloride or methacrylyl chloride with an aminoalkyl urea of the formula IX        HN(R³)ANRCONH₂ or HN(R³)ANRCONHR' in an inert solvent, such as carbon tetrachloride, in the presence of a base acceptor for HCl, such as sodium hydroxide, pyridine or excess of the aminoalkyl urea, at a temperature of —20° C. to about 50° C.

The amides of Formula III are prepared in similar fashion by the reaction of acrylyl chloride or methacrylyl chloride with an N-aminoalkyl-N,N'-alkylene urea of the general structure of the formula

X

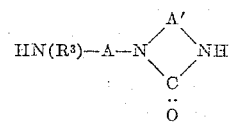

The compounds of any of Formulas I, II, and III may be polymerized separately or two or more of these compounds may be copolymerized with each other, or one or more of these compounds may be copolymerized with other monoethylenically unsaturated monomers in the presence of acylic azo catalysts, such as azodiisobutyronitrile, azodiisobutyramide, or dimethyl azodiisobutyrate. The monomer or monomers are mixed directly or in the presence of an inert solvent and the mixture is maintained between 60° C. and 100° C. until the desired extent of polymerization is attained. When the monomers are appreciably water-soluble, water may be used as the solvent, if desired. Other solvents that may be used include methanol, ethanol, isopropanol, butanol, dimethylformamide, benzene, toluene, ethyl acetate, etc. The amount of catalyst may be varied from about 0.1% to about 5% of the weight of monomer or monomers. The polymerization is best carried out in an inert atmosphere, such as nitrogen gas. For polymerization in solution, concentrations of monomer from about 10% to about 60% are generally desirable. The course of polymerization may be readily followed by determining the increase in viscosity of the solution. The catalyst may be added in increments, if desired, with or without additional solvent. Chain transfer agents may be used.

Comonomers that may be copolymerized with the monomers of Formulas I, II, and III (the monomer or monomers of the Formulas I, II, and III being present in an amount of at least 5 mole percent, and preferably at least 50 mole percent, of the entire monomer mixture) include esters of acrylic acid or methacrylic acid and monohydric alcohols such as methyl, ethyl, butyl, octyl, dodecyl, cyclohexyl, cyanoethyl, and the like; esters of itaconic acid and the above alcohols; esters from maleic, fumaric or citraconic acids and the above alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, hydroxyethyl vinyl ether, aminoethyl vinyl ether, aminopropyl vinyl ether, dimethylaminoethyl vinyl ether, vinyloxyethoxyethanol, vinyloxyproxyethanol; allyl alcohol, allyl acetate, methacrylonitrile or acrylonitrile; acrylamide, or methacrylamide, and N-substituted amides of these types, such as dimethyl acrylamide; vinyl chloride, vinyl bromide, vinylidene chloride, vinylidene fluoride, vinylidene cyanide, 1-chloro-1-fluoroethylene, or ethylene, N-methyl-N-vinyloxyethylmelamine, styrene, vinyl toluene, 2-vinylpyridine, 4-vinylpyridine, N-vinylpyrrolidone, and N-vinylcaprolactam.

From the polymers, methylolated compounds are obtained by reacting with formaldehyde in the relative proportions hereinbefore stated. The reaction is most conveniently effected with aqueous formaldehyde, the 30% to 38% solutions of commerce being generally useful. Revertible polymers of formaldehyde and alcoholic solutions of formaldehyde may also be used. The alcoholic solutions are particularly suitable in reacting solvent soluble polymers.

An aqueous 10% to 60% solution of a water-soluble polymer is desirably taken and mixed with a formaldehyde solution. The pH of such solution and of the reaction mixture should be above 7 and be not over 10 for best results. The temperature of reaction is kept within the range between 20° and 90° C., the most suitable reacting temperatures depending in part upon the pH of the reaction mixture, the concentration of polymer, and the particular polymer. With a pH from 8 to 9.5 polymers from the lower members of the series of vinyl ethers may be readily reacted between 20° and 50° C. in a reasonable time. With polymers of the larger vinyl ethers temperatures from 40° to 80° C. are preferred. The reaction is carried on until sufficient of the ureido groups have been reacted and converted to hydroxymethylureido groups to supply the desired reactivity. It is not necessary to so convert every ureido group. Sufficient conversion is ordinarily obtained when 0.6 to 1.0 equivalent of formaldehyde is taken up per ureido group. A considerable excess of formaldehyde may be mixed with the polymer, such as 2 to 4 equivalents per ureido group.

It has been observed that while heating of the reaction mixture at pH's outside of the specified range will introduce methylol groups, the compositions may form gels. This has also been noted with excessive temperatures or with prolonged heating in the upper range of reaction temperatures. It must be commented, however, that gels formed can be homogenized and then used to react with an amine with excellent results.

The methylolated polymer is then reacted with an amine, selected from the group consisting of ethyleneimine, guanidine, morpholine, dimethylaminoethylamine, methoxyethylamine, pyrrolidine, piperidine, N-methylpiperazine, and primary and secondary monoamines in which the nitrogen atom is directly connected to at least one group selected from the group consisting of allyl, benzyl, cyclohexyl, alkyl groups having 1 to 8 carbon atoms, and hydroxyalkyl groups having 2 to 3 carbon atoms. When lower amines, including sufficient oxy, hydroxy or amino groups, are used, the polymer retains substantially the same order of hydrophilicity as it had before reaction with the amine. Examples of such amines include ethyleneimine, methyl-, dimethyl-, ethyl-, diethyl-, allyl-, diallyl-, propyl-, and isopropylamine and also ethanol-, diethanol-, propanol-, and isopropanol-amines, guanidine, morpholine, dimethylaminoethylamine, methoxyethylamine, pyrrolidine, piperidine, and N-methylpiperazine. When higher amines are used, the product of the reaction has correspondingly more hydrophobic properties and becomes insoluble in water but soluble in organic solvents, such as ethanol, etc. Examples of such amines are butyl-, dibutyl-, amyl-, diamyl-, cyclohexyl-, benzyl-, octylamines, and N-methylaniline. The reaction with the amine is carried out in solution, preferably in an aqueous or aqueous alcohol solution. The temperature may be from about 40° C. to 80° C. and the time may vary inversely with the temperature from about 10 to 40 minutes at the higher limits of temperature to about five to eight hours at the lower limit; the longer the time at any given temperature, the more extensive the condensation with amine that is effected. For example, reaction of 0.3 mole of dimethylamine (per ureido unit) on a methylolated poly-(ureidoethyl vinyl ether) (obtained from a 2:1 ratio of formaldehyde to poly-(ureidoethyl vinyl ether) for one-half to one hour at 60° C. produced a cationic resin which precipitated an aqueous solution of polyacrylic acid at a pH between 3 and 6.0. The reaction of about 0.2 mole to about 2.5 moles of the amine per ureido unit of the methylolated polymer provides novel resins of cationic character. Some or all of the methylol groups of the polymers are replaced by aminomethyl units with the liberation of water. Thus, when the methylolated poly-(ureido vinyl ethers) of Formulas IV, V, and VI are reacted with dimethylamine, some or all of the methylolated ureido units are converted to units having the structure of Formulas XI, XII, and XIII respectively:

XI     —CH₂—CH—
              |
              O—ANRCONHCH₂N(CH₃)₂

XII    —CH₂—CH—
              |
              O—ANRCON(R′)CH₂N(CH₃)₂

XIII   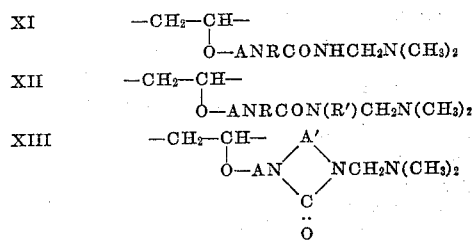

The methylolated esters and amides of Formulas I, II, and III are similarly converted to dimethylaminomethyl derivatives of analogous structure.

When the products are of vinyl ether type, the preferred mole ratio of formaldehyde to ureido group is about 2 and the preferred mole ratio of amine to ureido group is 0.4 to 0.6. In the case of the esters and amides the same approximately 2:1 ratio of formaldehyde to ureido group is preferred but the mole ratio of amine to ureido groups is about 0.8 to 1.2. The condensation products may have molecular weights of a wide range such as from below 10,000 to over 150,000.

The reaction products of the present invention, depending upon the particular amine used, vary from highly water-soluble to water-insoluble masses adapted to be applied in the coating, molding, adhesive and laminating industries by way of aqueous solutions or solutions in organic solvents and then converted to insoluble form by heating alone or, if desired, in conjunction with additional reactants to modify the cross-linkages formed between the polymer molecules. Water-soluble reaction products of the present invention may be incorporated in paper-making pulps or stocks of all types including bleached and unbleached pulps, such as in the beater and on subsequent drying and/or additional heating or baking, provide increased wet strength to the paper. In addition, these new reaction products may be used for the sizing of paper, as by tub-sizing, or the sizing or dressing of textiles, for example, as a warp-size in the case of the water-soluble products or as a permanent water-repellent and dye-modifying finish in the case of the water-insoluble products. Thus, there may be dissolved in a dimethyl-formamide solution of a polymer of acrylonitrile containing 75% to 100% acrylonitrile units in the polymer molecule and 0 to 25% of other units, e. g., of vinyl chloride, vinyl acetate, etc., about 2 to 10% on the weight of the acrylonitrile polymer of a water-insoluble reaction product of the present invention. The fibers, films and other products obtained therefrom by extrusion into a coagulant have improved dye-receptivity, especially to acid dyes. Because of their substantivity to cellulosic materials, the new reaction products even of water-soluble character may be applied from solutions including aqueous solutions to cellulosic films, fibers, filaments, yarns, cords (including ropes) or fabrics thereof and subsequently insolubilized or cured by heating, thereby to modify the moisture-retention, dimensional effects like shrinkage on wetting, and dyeing properties of the treated materials. Examples of the cellulosic materials thus treated may include cotton, cellulose acetate, rayon, ramie, sisal, and Manila hemp.

The following examples are illustrative of the invention:

Example I

Dimethylamine, 7.2 g. of 25% aqueous solution (0.04 mole), is added to 160 g. of aqueous solution containing 16 g. (0.1 mole) of polymethylol poly-(ureidoethyl vinyl ether) of the approximate formula

where $n$ is approximately 250–300 and approximately 0.1 mole (3 g.) of free formaldehyde. The mixture was warmed at 60° for one-half hour. The final resin solution had a pH of approximately 11.0 and comprised a polymer containing units having the structure

A small sample was acidified to pH 4.0 with dilute acetic acid and treated with several drops of diluted polyacrylic acid. A white precipitate formed immediately.

When 1% (polymer solids on fiber) of the resin solution obtained is added to a bleached kraft pulp in the beater, 53% thereof is retained in the paper and the wet tensile strength of the paper after one day was 9.3 lbs./in. When the same percentage of the polymethylol poly-(ureidoethyl vinyl ether) is used, only 5% to 12% thereof is retained and the wet tensile strength of the paper after one day was about 1 pound per inch. Similar comparative results are obtained from bleached sulfite.

Example II

Guanidine (0.05 mole) was added to 160 g. of aqueous solution containing 16 g. (0.1 mole) of the same polymethylolated polymer as in Example I and 0.1 mole (3 g.) of free formaldehyde. The mixture was warmed at 60° C. for one-half hour.

The addition of 1% to 2% of the resin solutions thus obtained to paper pulps of both bleached and unbleached types in the beating stage imparted good wet strengths to papers formed thereof.

Example III

The procedure of Example I is followed replacing the 0.04 mole of dimethylamine with 0.04 moles of each of the following amines in separate runs:

a. Diethylamine
b. Methylamine
c. Morpholine
d. Ethanolamine
e. Diethanolamine
f. N-methylaniline
g. Octylamine
h. Dicyclohexylamine All of the resin products thereby obtained gave improved wet strengths in both bleached and unbleached pulps.

Example IV (a) To a solution containing 8.0 g. of β-ureidoethyl acrylate, 8 g. of water, and 1 g. of piperidine is added 0.1 g. of ammonium persulfate and 0.05 g. of sodium hydrosulfite. Nitrogen is bubbled through the solution. The temperature increases from 30° to 35° and remains at 35° for about twenty minutes. The addition of 0.1 g. ammonium persulfate and 0.05 g. of sodium hydrosulfite does not cause another exotherm. After one hour at room temperature, the reaction mixture is poured into acetone to precipitate the polymer. The acetone-insoluble material is dissolved in water, reprecipitated with acetone, and dried at 0.5 mm. Hg for ten hours. There is obtained a white, brittle solid polymer consisting of poly(2-ureidoethyl acrylate).

(b) This polymer is condensed with excess aqueous formaldehyde at pH 8.5 to give a polymethylol derivative which is then treated with 0.4–1.2 moles dimethylamine per mole of urea-containing unit. The resultant polymers are composed of dimethylaminomethylureidoethyl acrylate units in addition to methylolureidoethyl acrylate units and ureidoethyl acrylate units. The proportions of each of these units in any one polymer vary with the amount of amine added.

The products thus obtained serve as wet-strength improvers for paper and the inclusion of 1% to 2% thereof in cellulose acetate fibers, films and the like serves to inhibit gas-fading of the dyed films and the like.

Example V (a) A solution containing 10 g. of N-(β-acryloxyethyl)-N,N'-ethyleneurea, 20 g. of dimethylformamide, 0.1 g. of mercaptoethanol, and 0.1 g. of dimethyl azodiisobutyrate is heated under nitrogen for eighteen hours at 65° C. The polymerization mixture is poured into acetone to precipitate the polymer. The precipitated polymer is dissolved in a small amount of water, reprecipitated by addition of acetone, and dried at 0.5 mm. Hg for twenty hours at 60° C. The resulting poly(acryloxyethylethyleneurea) is an almost white, brittle solid which is soluble in water, methanol, and dimethylformamide but insoluble in acetone.

(b) The polymer obtained in part (a) hereof is reacted with 37% aqueous formaldehyde (3 moles HCHO for each ureido unit in the polymer). To the resulting solution containing the polymethylolated polymer and free formaldehyde, dimethylamine in an amount of 2.5 moles per ureido unit is added and the mixture is heated at 50° C. for three hours.

The product is useful as a wet-strength improver for paper and the incorporation of 1% to 8% in a copolymer of acrylonitrile (90%) with vinyl acetate (10%) improves the dyeability of fibers, films or other structures, especially by acid or wool dyes.

(c) By the same procedure as in (a) and (b) hereof a corresponding condensate is obtained from β-ureidoethyl methacrylate.

Example VI (a) A solution containing 18.3 g. (0.1 mole) of N-(β-acrylamidoethyl)N,N'-ethyleneurea, 36.7 g. of water, 0.2 g. of mercaptoethanol, and 0.2 g. of dimethyl azodiisobutyrate is heated under nitrogen for eighteen hours at 65° C. The reaction mixture is added to 800 ml. of acetone. The precipitated polymer is dissolved in water, reprecipitated with acetone, and dried at 0.5 mm. Hg and 60° C. for twenty hours. There results 17.8 g. of a tan, brittle hygroscopic solid, poly(acrylamidoethylethyleneurea).

(b) A solution of 6.27 g. (0.034 mole) of the poly-(acrylamidoethylethyleneurea) obtained in part (a) hereof in 60 ml. of water is added over a period of twenty minutes to a mixture of 14.2 g. of 36.4% aqueous formaldehyde (0.17 mole) in 50 ml. of water. The pH is maintained at 8.5 during the addition by addition of 40% sodium hydroxide. The solution is heated at 65° C. for two hours. The resultant solution contains polymethylol poly(acrylamidoethylethyleneurea); a 1% solution at pH 4 does not give a precipitate with polyacrylic acid.

However, when the solution of polymethylol poly-(acrylamidoethylethyleneurea) is mixed with dimethylamine (0.8 mole per ureido unit) and the mixture heated at 65° C. for two hours, the resulting solution at 1% concentration and pH 4 gives a precipitate with polyacrylic acid and comprises a polymer containing units of dimethylaminomethylethyleneureidoethyl acrylamide,

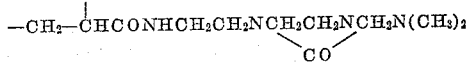

(c) N-(β-methacrylamidoethyl) - N,N'-ethyleneurea is polymerized by the procedure of part (a) hereof and is then reacted with formaldehyde and dimethylamine by the procedure of part (b) hereof.

(d) The dimethylamino-modified polymers obtained in parts (b) and (c) hereof are useful for imparting wet strength to paper by beater addition and they may be added to resin-forming urea-formaldehyde condensates in the water-soluble stage to provide a coating resin valuable for anchoring hydrophobic finishing coatings, such as of saran, nylon, polyethylene, rubber, or synthetic rubbers, to hydrophilic materials, such as fibers, films, or sheets of regenerated cellulose, cotton, polyvinyl alcohol or the like. This polymer is also useful as a component of rubber latices or synthetic rubber latices for use as a tire cord adhesive.

(e) Similarly useful products are obtained when the procedures of parts (b) and (c) hereof are carried out with the replacement of the dimethylamine with a molarly corresponding amount of (1) dibutylamine, (2) benzlyamine, and (3) piperidine respectively.

*Example VII*

(a) A solution containing 100 g. of N-(β-methacrylamidoethyl)-N,N'-ethyleneurea, prepared from N-(β-aminoethyl)-N,N'-ethyleneurea and methacrylyl chloride, 200 g. of water, 0.2 g. of mercaptoethanol, and 0.5 g. of dimethyl azodiisobutyrate is stirred and heated for sixteen hours under nitrogen.

The reaction mixture is added to 2 liters of acetone. The acetone layer is removed, and the residue is dissolved in 225 ml. of water. The polymer is precipitated with 2 liters of acetone, dissolved in 225 ml. of water, and reprecipitated with acetone. After removal of the acetone, the residue is dried for thirty hours at 60° C. and 0.5 mm. Hg pressure. There is obtained 94.6 g. of a very light tan, brittle hydroscopic solid. The Gardner-Holdt viscosities of aqueous solutions of this polymer of methacrylamidoethylethyleneurea are Z-1 at 33⅓% solids and Q at 25% solids.

(b) Several polymethylol poly(methacrylamidoethylethyleneureas) prepared with 2:1, 3:1, and 5:1 molar ratios of formaldehyde to ureido groups are prepared by condensation of 9.85 g. (0.05 mole) of poly(methacrylamidoethylethyleneurea) of part (a) hereof with 8.23 g. (0.10 mole HCHO), 12.32 g. (0.15 mole), and 20.56 g. (0.25 mole) of 36.5% aqueous formaldehyde, respectively, the final concentration of the aqueous resin solutions being 10%. The starting polymethacrylamide had a Gardner-Holdt viscosity of Z-1 in 33⅓% aqueous solution.

To prepare a dimethylamine condensate the following general procedure is used.

11.35 g. (.005 mole) of the polymethylol solution prepared at a 5:1 ratio of formaldehyde to ureido groups is added to 0.225 g. of 40% aqueous dimethylamine; the pH of the resulting solution is adjusted to 8.5 with acetic acid, and the reaction mixture is heated for two hours at 65° C. This corresponds to 0.4 mole of amine per ureido group. The same procedure is followed with dimethylamine equivalent to 0.8, 1.2, 1.6, and 2.0 moles per ureido group. Similar series are prepared with the resins prepared at 3:1 and 2:1 ratios of formaldehyde to ureido units. The polymers prepared by reaction with dimethylamine each contained units of dimethylaminomethylethyleneureidoethyl methacrylamide. The wet strength results are summarized in the following table for application of 2% resin to bleached kraft and 1% resin to unbleached kraft. The values given are the wet tensile strength values in lbs./in. for bleached kraft after one day and for unbleached kraft after three days.

| Ratio: CH₂O/Ureido | Pulp | Moles DMA/Ureido | | | | |
|---|---|---|---|---|---|---|
| | | 0.4 | 0.8 | 1.2 | 1.6 | 2.0 |
| 5:1 | Bl. kraft | 9.2 | 11.5 | 12.5 | 11.6 | 11.1 |
| 3:1 | do | 10.5 | 9.6 | 11.4 | 9.1 | 7.6 |
| 2:1 | do | 12.0 | 10.5 | 9.2 | 10.2 | 8.6 |
| 5:1 | Unbl. kraft | 14.9 | 15.6 | 15.2 | 14.3 | 14.2 |
| 3:1 | do | 15.7 | 14.5 | 13.2 | 12.4 | 12.3 |
| 2:1 | do | 13.9 | 13.7 | 11.9 | 13.3 | 11.2 |

*Example VIII*

A solution containing 1.97 g. (0.01 mole equivalent) of poly(methacrylamidoethylethyleneurea) of Example VI(a), 0.45 g. of 40% aqueous dimethylamine (0.4 mole per mole ureido), and 10 g. of water is added to a solution of 1.65 g. (0.02 mole) of 36.5% aqueous formaldehyde in 5 g. of water. The pH is maintained at 8.5 during the addition. The reaction mixture is heated at 65° C. for two hours. This is repeated with 0.90 g. and with 1.35 g. of 40% dimethylamine to give samples with 0.8 and 1.2 moles of dimethylamine per mole ureido group respectively. When 2% of these resins were applied to bleached kraft pulp the wet tensile strengths of the derived paper after one day were 10.3, 9.6, and 9.5 lbs./in. for 0.4, 0.8, and 1.2 moles of dimethylamine, respectively. In each case, the polymer is composed of units of methacrylamidoethylethyleneureidomethyldimethylamine in varying proportions with methacrylamidoethylethyleneurea and its methylol derivative.

*Example IX*

(a) A solution containing 10 g. of N-(γ-methacrylamidopropyl)hexahydropyrimidone-2, 21.6 g. of water, 0 42 g. of mercaptoethanol, and 0.11 g. of dimethyl azodiisobutyrate is heated under nitrogen at 65° C. for sixteen hours. The polymer is precipitated with acetone, redissolved in water, reprecipitated with acetone, and dried at 0.5 mm. Hg for eighteen hours at 60° C. There is obtained 7.4 g. of an almost white, brittle solid. The Gardner-Holdt viscosity of a 33⅓% aqueous solution of this polymer is C-.

(b) A solution of 4.51 g. (.02 mole ureido) of N-(γ-methacrylamidopropyl)hexahydropyrimidone-2 of part (a) hereof in 10 g. of water is added to 8.27 g. (0.10 mole) of 36.4% aqueous formaldehyde in 25 g. of water with adjustment of pH to 8.5 with aqueous sodium hydroxide. The mixture is heated for two hours in the steam oven to give a solution of the polymethylol derivative. A 1% solution at pH 4 does not give a precipitate with polyacrylic acid solution.

When the solution of polymethylol poly(methacrylamidopropylhexahydropyrimidone) prepared as described above is mixed with 1.8 g. (.016 mole) of 40% aqueous dimethylamine at pH 8.5 and the mixture is heated for two hours at 65° C., the resultant solution at 1% concentration and pH of 4 gives a precipitate with polyacrylic acid and the derived polymer contains units of N-(dimethylaminomethyl) - 2 - keto-hexahydropyrimidylpropyl methacrylamide of the structure

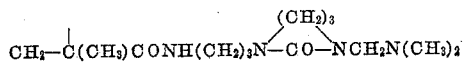

The derived polymer imparts wet strength to paper when added in small amounts (1% to 2% on pulp solids) to the beater. When added to rubber latices it provides a good adhesive for bonding rayon and nylon tire cords to rubber. It is useful as a loom finish; that is, it may be applied to yarns to be woven to protect them during weaving and it may be allowed to remain in the woven fabric as a permanent finish therefor.

Example X

A solution containing 30 g. of a terpolymer (comprising 58.3 mole percent N-(β-acrylamidoethyl)-N,N'-ethyleneurea, 39 mole percent methyl acrylate, and 2.69 mole percent acrylic acid) in 55.4 g. of water is added to a solution (pH 8–9) of 49.2 g. of 36.5% aqueous formaldehyde in 78.0 g. of water. The pH is maintained at 8–9 and the temperature at 45° to 50° C. during the addition. The mixture is heated at 70° to 75° C. for one hour. The resulting solution contains 15% resin solids.

Mixtures of 30.5 g. of the above solution with 2.6 g., 5.2 g., and 7.8 g. respectively of 40% aqueous dimethylamine, are heated at a pH of 8.0 to 8.5 for two and one-half hours at 60° to 65° C. The solutions thus obtained give positive tests for cationic activity; i. e. a 1% solution at pH 4.5 gives a precipitate with polyacrylic acid.

Thirty gram samples of each of the formaldehyde condensates of the terpolymer (15% resin solids) are heated at 60° C. for forty-five minutes with the following additives:

Diethanolamine: 2.3, 4.5, and 9.0 g. respectively
Methylethanolamine: 1.5, 3.0, 6.0 g. respectively
Monoethanolamine: 1.22 g.

The pH of each mixture is then adjusted to 8.0 with 50% formic acid. Each mixture is cationic active as shown by precipitation with polyacrylic acid.

All of these resin solutions are evaluated as wet strength resins on bleached southern kraft with 3% alum. The results are shown below with the amount of amine calculated as moles per 30 g. of the 15% solids formaldehyde condensate prepared as described previously.

| Amine | Moles of Amine per 30 g. resin | Percent Resin on pulp | Wet Tensile Strength/lb. (in.) after One Day |
|---|---|---|---|
| Dimethylamine | .0226 | 2.0 | 6.8 |
|  | .045 | 2.0 | 9.4 |
|  | .068 | 2.0 | 8.9 |
| Diethanolamine | .021 | 0.5 | 4.7 |
|  | .043 | 0.5 | 5.3 |
|  | .086 | 0.5 | 5.9 |
| Methylethanolamine | .02 | 0.5 | 5.0 |
|  | .04 | 0.5 | 6.2 |
|  | .08 | 0.5 | 4.8 |
| Monoethanolamine | .02 | 0.5 | 5.7 |

Example XI

A copolymer of 60 mole percent styrene and 40 mole percent of β-ureidoethyl acrylate is reacted with 37% aqueous formaldehyde, using 2 moles thereof per ureido unit in the copolymer. Then 1.6 mole (per mole of ureido units) of t-octylamine is added to the methylolated polymer dispersion and the mixture is heated to 60° C. for one hour. The product precipitates from the aqueous reaction mixture but is soluble in acetone and on application of 3% (on the weight of the fabric) to a rainwear fabric, a water-repellent finish is obtained.

In the condensation products of the present invention, size is achieved by linear addition polymerization not involving the urea groups. The resultant resins are generally linear (including side-chain branching), relatively large (compared to polymers obtained simply by condensation) and the functional groups are sterically free. The functional groups are terminal to flexible side-chains, not involved in the initial condensation, free to readily react with formaldehyde and amines and free to interact subsequently with various substrates. The large size obtainable in this manner contributes to efficiency in performance as in obtaining paper wet-strength, contributes film-forming properties to the polymer with toughness and elasticity characteristic of vinyl-type polymers, and contributes non-diffusibility important for retention in applications involving additions to spinning masses involving regeneration.

Throughout the specification and claims, the symbols employed in the structural formulas have the same meaning as given at their first occurence.

It is to be understood that changes and variations may be made without departing from the spirit and scope of the invention as defined in the appended claims.

We claim:

1. A composition of matter comprising a condensation product, obtained at a pH above 7, of an amine, selected from the group consisting of ethyleneimine, guanidine, morpholine, dimethylaminoethylamine, methoxyethylamine, pyrrolidine, piperidine, N-methylpiperazine, and primary and secondary monoamines in which the nitrogen atom is directly connected to at least one group selected from the group consisting of allyl, benzyl, cyclohexyl, alkyl groups having 1 to 8 carbon atoms, and hydroxyalkyl groups having 2 to 3 carbon atoms, with formaldehyde and an addition polymer of a ureido compound selected from the group consisting of those having the Formulas I, II, and III:

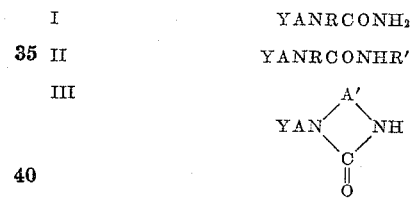

in which Y is selected from the group consisting of $CH_2{:}CHO{-}$, $CH_2CR^2COO{-}$, and $CH_2CR^2CON(R^3){-}$, $R^2$ being selected from the group consisting of hydrogen and methyl and $R^3$ being selected from the group consisting of hydrogen and methyl, A is selected from the group consisting of $-C_2H_4-$, $-CH(CH_3)CH_2-$, $-CH_2CH(CH_3)-$, and $-(CH_2)_3-$, A' is selected from the group consisting of $-(CH_2)_2-$, $-CH_2CH(CH_3)-$, $-CH(CH_3)CH_2-$, and $(CH_2)_3$, R is selected from the group consisting of H, methyl, and ethyl, and R' is selected from the group consisting of methyl and ethyl, the molar ratio of formaldehyde to ureido groups being from 1:1 to 5:1 and the molar ratio of amine to ureido groups being from 0.2:1 to 2.5:1.

2. A composition as defined in claim 1 in which the polymer is a vinyl ether.

3. A composition as defined in claim 1 in which the polymer is an ester of an acid selected from the group consisting of acrylic acid and methacrylic acid.

4. A composition as defined in claim 1 in which the polymer is an amide of an acid selected from the group consisting of acrylic acid and methacrylic acid.

5. A composition as defined in claim 1 in which the polymer is a vinyl ether and the ratio of formaldehyde to ureido groups is approximately 2:1.

6. A composition as defined in claim 1 in which the polymer is a vinyl ether and the ratio of formaldehyde to ureido groups is approximately 2:1 and the ratio of amine to ureido groups is between 0.4:1 to 0.6:1.

7. A composition as defined in claim 1 in which the polymer is a vinyl ether and the amine is diethylamine.

8. A composition as defined in claim 1 in which the polymer is a vinyl ether and the amine is guanidine.

9. A composition as defined in claim 1 in which the polymer is a vinyl ether and the amine is dimethylamine.

10. A composition of matter as defined in claim 1 in which the product is a water-soluble condensation product.

11. A composition of matter comprising a condensation product of an amine, selected from the group consisting of ethyleneimine, guanidine, morpholine, dimethylaminoethylamine, methoxyethylamine, pyrrolidine, piperidine, N-methylpiperazine, and primary and secondary monoamines in which the nitrogen atom is directly connected to at least one group selected from the group consisting of allyl, benzyl, cyclohexyl, alkyl groups having 1 to 8 carbon atoms, and hydroxyalkyl groups having 2 to 3 carbon atoms, with a reaction product obtained at a pH above 7, of a mixture of formaldehyde and an addition polymer of $$CH_2:CR^2COOC_2H_4NHCONH_2$$

in which $R^2$ is selected from hydrogen and methyl, the molar ratio of formaldehyde to ureido groups in the mixture being about 2:1 and the ratio of amine to ureido groups in the condensation product being from 0.8 to 1.2.

12. A composition as defined in claim 11 in which the amine is dimethylamine.

13. A process comprising reacting, at a pH above 7 and a temperature between about 40° C. and 80° C., formaldehyde with an amine, selected from the group consisting of ethyleneimine, guanidine, morpholine, dimethylaminoethylamine, methoxyethylamine, pyrrolidine, piperidine, N-methylpiperazine, and primary and secondary monoamines in which the nitrogen atom is directly connected to at least one group selected from the group consisting of allyl, benzyl, cyclohexyl, alkyl groups having 1 to 8 carbon atoms, and hydroxyalkyl groups having 2 to 3 carbon atoms, and an addition polymer of a compound selected from the group consisting of those having the Formulas I, II, and III:

I   YANRCONH₂

II  YANRCONHR'

III 
```
         A'
    YAN/   \AN
        \C/
         ‖
         O
``` in which Y is selected from the group consisting of $CH_2:CHO-$, $CH_2:CR^2COO-$, and $$CH_2:CR^2CON(R^3)-,$$

$R^2$ being selected from the group consisting of hydrogen and methyl and $R^3$ being selected from the group consisting of hydrogen and methyl, A is selected from the group consisting of $-C_2H_4-$, $-CH(CH_3)CH_2-$, $$-CH_2CH(CH_3)-,$$

and $-(CH_2)_3-$, A' is selected from the group consisting of $-(CH_2)_2-$, $-CH_2CH(CH_3)-$, $$-CH(CH_3)CH_2-,$$

and $(CH_2)_3$, R is selected from the group consisting of H, methyl, and ethyl, and R' is selected from the group consisting of methyl and ethyl, the molar ratio of formaldehyde to ureido groups being from 1:1 to 5:1 and the molar ratio of amine to ureido groups being from 0.2:1 to 2.5:1.

14. A process comprising the steps of reacting, at a pH above 7 and at a temperature between about 20° C. and about 80° C., a mixture of formaldehyde with an addition polymer of a compound selected from the group consisting of those having the Formulas I, II, and III:

I   YANRCONH₂

II  YANRCONHR'

III 
```
         A'
    YAN/   \NH
        \C/
         ‖
         O
``` in which Y is selected from the group consisting of $CH_2:CHO-$, $CH_2:CR^2COO-$, and $$CH_2:CR^2CON(R^3)-,$$

$R^2$ being selected from the group consisting of hydrogen and methyl and $R^3$ being selected from the group consisting of hydrogen and methyl, A is selected from the group consisting of $-C_2H_4-$, $-CH(CH_3)CH_2-$, $-CH_2CH(CH_3)-$, and $-(CH_2)_3-$, A' is selected from the group consisting of $-(CH_2)_2-$, $-CH_2CH(CH_3)-$, $-CH(CH_3)CH_2-$, and $(CH_2)_3$, R is selected from the group consisting of H, methyl, and ethyl, and R' is selected from the group consisting of methyl and ethyl, and then reacting the resulting poly-methylolated polymer, at a temperature between about 40° C. and 80° C., with an amine, selected from the group consisting of ethyleneimine, guanidine, morpholine, dimethylaminoethylamine, methoxyethylamine, pyrrolidine, piperidine, N-methylpiperazine, and primary and secondary monoamines in which the nitrogen atom is directly connected to at least one group selected from the group consisting of allyl, benzyl, cyclohexyl, alkyl groups having 1 to 8 carbon atoms, and hydroxyalkyl groups having 2 to 3 carbon atoms, the molar ratio of formaldehyde to ureido groups in the mixture being from 1:1 to 5:1 and the molar ratio of amine to ureido groups being from 0.2:1 to 2.5:1.

15. A composition of matter comprising a condensation product of diethylamine with a reaction product, obtained at a pH above 7, of a mixture of formaldehyde and an addition polymer of

```
               O
               ‖
               C
              / \
CH₂:CHOC₂H₄N    NH
             |   |
            H₂C—CH₂
``` the molar ratio of formaldehyde to ureido groups in the mixture being about 2:1 and the molar ratio of diethylamine to ureido groups being between 0.4:1 to 0.6:1.

16. A composition of matter comprising a condensation product of guanidine with a reaction product, obtained at a pH above 7, of a mixture of formaldehyde and an addition polymer of

```
               O
               ‖
               C
              / \
CH₂:CHOC₂H₄N    NH
             |   |
            H₂C—CH₂
``` the molar ratio of formaldehyde to ureido groups in the mixture being about 2:1 and the molar ratio of guanidine to ureido groups being between 0.4:1 to 0.6:1.

17. A composition of matter comprising a condensation product of dimethylamine with a reaction product, obtained at a pH above 7, of a mixture of formaldehyde and an addition polymer of

```
               O
               ‖
               C
              / \
CH₂:CHOC₂H₄N    NH
             |   |
            H₂C—CH₂
``` the molar ratio of formaldehyde to ureido groups in the mixture being about 2:1 and the molar ratio of dimethylamine to ureido groups being between 0.4:1 to 0.6:1.

18. A composition of matter comprising a condensation product of dimethylamine with a reaction product, obtained at a pH above 7, of a mixture of formaldehyde and an addition polymer of
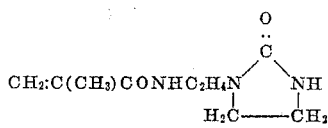
the molar ratio of formaldehyde to ureido groups in the mixture being about 2:1 and the ratio of amine to ureido groups in the condensation product being from 0.8 to 1.2.
References Cited in the file of this patent
UNITED STATES PATENTS
| | | |
|---|---|---|
| 2,689,844 | Melamed | Sept. 21, 1954 |
| 2,727,016 | Hankins et al. | Dec. 13, 1955 |